United States Patent
Imura et al.

(10) Patent No.: US 9,530,563 B2
(45) Date of Patent: Dec. 27, 2016

(54) DIELECTRIC CERAMIC COMPOSITION AND DIELECTRIC ELEMENT

(71) Applicant: TDK CORPORATION, Tokyo (JP)

(72) Inventors: Tomoya Imura, Tokyo (JP); Goushi Tauchi, Tokyo (JP); Masahito Furukawa, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 14/780,017

(22) PCT Filed: Feb. 4, 2014

(86) PCT No.: PCT/JP2014/052480
§ 371 (c)(1),
(2) Date: Sep. 25, 2015

(87) PCT Pub. No.: WO2014/156302
PCT Pub. Date: Oct. 2, 2014

(65) Prior Publication Data
US 2016/0049248 A1    Feb. 18, 2016

(30) Foreign Application Priority Data
Mar. 28, 2013 (JP) ................. 2013-067857

(51) Int. Cl.
*C04B 35/475* (2006.01)
*H01G 4/12* (2006.01)
*H01B 3/12* (2006.01)
*C04B 35/468* (2006.01)
*C04B 35/495* (2006.01)
*H01G 4/30* (2006.01)

(52) U.S. Cl.
CPC ......... *H01G 4/1227* (2013.01); *C04B 35/4682* (2013.01); *C04B 35/475* (2013.01); *C04B 35/495* (2013.01); *H01B 3/12* (2013.01); *H01G 4/1218* (2013.01); *H01G 4/30* (2013.01); *C04B 2235/3201* (2013.01); *C04B 2235/3203* (2013.01); *C04B 2235/3215* (2013.01); *C04B 2235/3232* (2013.01); *C04B 2235/3251* (2013.01); *C04B 2235/3298* (2013.01)

(58) Field of Classification Search
CPC .. C04B 35/4682; C04B 35/495; H01G 4/1227
See application file for complete search history.

(56) References Cited

U.S. PATENT DOCUMENTS

| 6,245,433 B1 | 6/2001 | Nakamura et al. | |
| 2015/0348709 A1* | 12/2015 | Tauchi | H01G 4/1218 501/139 |

FOREIGN PATENT DOCUMENTS

| JP | H11-322414 A | 11/1999 |
| JP | 2006-206362 A | 8/2006 |

OTHER PUBLICATIONS

May 13, 2014 Written Opinion issued in International Patent Application No. PCT/JP2014/052480.
Dittmer, Robert et al. "A High-Temperature-Capacitor Dielectric Based on K0.5Na0.5NbO3-Modified Bi1/2Na1/2TiO3—Bi1/2K1/2TiO3," Journal of the American Ceramic Society, vol. 95, No. 11, pp. 3519-3524, Nov. 2012.
Dittmer, Robert et al. "Lead-free high-temperature dielectrics with wide operational range," Journal of Applied Physics, vol. 109, pp. 034107-1 to 034107-5, 2011.
Zuo et al., "Structures and piezoelectric properties of (NaKLi)1-x(BiNaBa)xNb1-xTixO3 lead-free ceramics;" Applied Physics Letters; vol. 91; 062916; 2007; pp. 1-3.

* cited by examiner

*Primary Examiner* — Karl Group
(74) *Attorney, Agent, or Firm* — Oliff PLC

(57) ABSTRACT

The present invention relates to a dielectric ceramic composition which is complex oxides represented by the following formula (1), $\{[(Bi_sNa_t)_a(Bi_uK_v)_bBa_c]_{1-d}A_d\}_xTi_{1-d}Nb_dO_3$ (1), wherein, in formula (1), A represents at least one element selected from the group consisting of Li, Na and K, and a, b, c, d, s, t, u, v and x are numbers respectively satisfying the following formulae, $0.10 \leq a \leq 0.95$, $0.00 < b \leq 0.85$, $0.05 \leq c \leq 0.70$, $a+b+c=1$, $0.10 \leq d \leq 0.50$, $0.90 \leq s+u \leq 1.00$, $0.45 \leq t \leq 0.50$, $0.45 \leq v \leq 0.50$ and $0.95 \leq x \leq 1.05$.

2 Claims, 2 Drawing Sheets

DIELECTRIC CERAMIC COMPOSITION AND DIELECTRIC ELEMENT

The present invention relates to a dielectric ceramic composition and an electronic component using the same. In particular, the present invention relates to a dielectric ceramic composition and a dielectric element that can be suitably utilized in a mid-high voltage application with a relatively high rated voltage.

BACKGROUND

In recent years, as the electronic circuits are disposed in a high density, the requirement for the miniaturization of electronic component is increasing. Besides, as the laminated ceramic capacitor is quickly developed to have a small size and a large capacity, more applications are provided and various properties are required.

For example, in a capacitor having a rated voltage higher than 100 V for mid-high voltage application, a high electrostatic capacity is required under an electric field with a high intensity, wherein the mentioned capacitor for mid-high voltage application is used in an ECM (engine electric computer module), a fuel injecting device, an electronic controlled throttle, an inverter, a converter, an HID head lamp unit, a battery controlling unit for a hybrid engine, a digital still camera or the like.

However, the conventional dielectric ceramic composition is designed on the premise of being used under a direct voltage having a low electric field intensity of, for example, about 1 V/µm, so the used laminated ceramic capacitor is developed to be thinner and thinner. If such a ceramic capacitor is used under an electric field with a high intensity, a problem rises that the variation rate of the electrostatic capacity relative to the applied direct current electric field (hereinafter referred to as the variation rate of DC bias) becomes larger.

If the variation rate of DC bias is large, the effective capacity in the laminated ceramic capacitor will decrease, and the required electrostatic capacity in the designing stage will not be satisfied. Thus, there might be problems such as the behavior of the electronic device using the laminated ceramic capacitor becomes unstable or even the electronic device does not work anymore.

Therefore, with respect to a capacitor to be used in a high electric field, the variation rate of DC bias should be small. Besides, a dielectric ceramic composition is expected to be used which has a high permittivity when a high electric field is applied. In addition, the "high electric constant" described here refers to, for instance, an intensity of 5 V/µm for the electric field, and a high permittivity refers to, for example, 1000.

In order to solve the technical problem mentioned above, the following Patent Document 1 has disclosed a dielectric ceramic composition with the following characteristics. In particular, it contains a main component and a subcomponent, wherein the main component consists of barium titanate having 0.02 wt % or less of oxide of alkali metal(s), at least one selected from the group consisting of europium oxide, gadolinium oxide, terbium oxide, dysprosium oxide, holmium oxide, erbium oxide, thulium oxide and ytterbium oxide, barium zirconate, magnesium oxide, manganese oxide and can be represented by the formula of $(BaO)_m TiO_2 + \alpha R_2O_3 + \beta BaZrO_3 + \gamma MgO + gMnO$ (in the formula, $R_2O_3$ is at least one selected from the group consisting of $Eu_2O_3$, $Gd_2O_3$, $Tb_2O_3$, $Dy_2O_3$, $HO_2O_3$, $Er_2O_3$, $Tm_2O_3$ and $Yb_2O_3$, $\alpha$, $\beta$, $\gamma$ and g represent the molar ratios, and $0.001 \leq \alpha \leq 0.06$, $0.005 \leq \beta \leq 0.06$, $0.001 < \gamma \leq 0.12$, $0.001 < g \leq 0.12$, $\gamma + g \leq 0.13$, and $1.000 < m \leq 1.035$), and the subcomponent is silicone oxide contained in an amount of 0.2 to 5.0 mol calculated in terms of $SiO_2$ relative to 100 mol of the main component. However, even though the ceramic capacitor using the dielectric ceramic composition shown in Patent Document 1 as the dielectric material has a relatively high relative permittivity of about 1500, it has a high variation rate of DC bias as large as −45% or less under an electric field of 5 V/µm. In this respect, the DC bias related properties are expected to be further improved.

In addition, Patent Document 2 has disclosed a dielectric ceramic composition as follows. In particular, it is a dielectric ceramic which contains Ca, Sr, Mg, Mn and rare earth element(s), and the dielectric ceramic contains main grains which are formed by dissolving at least part of the Ca, Sr, Mg, Mn and the rare earth element(s) as solid solute in perovskite-type grains of barium titanate (BCT-type grains) in which part of A site is replaced by the Ca. In the dielectric ceramic, the amount of Al is 0.01 mass % or less when calculated in terms of oxides. The main grains have a higher concentration of Ca at the grain surface than that at the grain center and are of a core-shell structure with Sr, Mg, Mn and the rare earth element(s) unevenly distributed at the grain surface. Further, the grains have an average grain size of 0.1 to 0.5 µm.

However, although the BCT-type dielectric ceramic composition as shown in Patent Document 2 has a large relative permittivity of 2500 or more, it has a large variation rate of DC bias of −70% or less under an electric field of 5 V/µm. Thus, the DC bias related properties cannot be said to be good.

PATENT DOCUMENT

Patent Document 1: JP-A-H11-322414
Patent Document 2: JP-A-2006-206362

SUMMARY

The present invention is made in view of the actual situations and aims to provide a dielectric ceramic composition and that can be suitably utilized in a mid-high voltage application with a relatively high rated voltage and has a very small variation rate of DC bias of −15% or less under an electric field of 5 V/µm and also a relatively high relative permittivity of 1000 or more. The present invention also aims to provide a dielectric element using this dielectric ceramic composition.

In order to reach the goal mentioned above, the present invention provides a dielectric ceramic composition composed of the complex oxides represented by the following formula (1).

$$\{[(Bi_s Na_t)_a (Bi_u K_v)_b Ba_c]_{1-d} A_d\}_x Ti_{1-d} Nb_d O_3 \qquad (1)$$

In formula (1), A represents at least one element selected from the group consisting of Li, Na and K, and a, b, c, d, s, t, u, v and x are numbers respectively satisfying the following formulae.

$0.10 \leq a < 0.95$ $0.00 < b \leq 0.85$ $0.05 \leq c \leq 0.70$ $a+b+c=1$ $0.10 \leq d \leq 0.50$ $0.90 \leq s+u \leq 1.00$ $0.45 \leq t \leq 0.50$ $0.45 \leq v \leq 0.50$ $0.95 \leq x \leq 1.05$ With the constitution mentioned above, the dielectric ceramic composition of the present invention has a very small variation rate of DC bias of −15% or less under an electric field of 5 V/μm, and a relatively high relative permittivity of 1000 or more can be provided.

In addition, the present invention provides a dielectric element containing the dielectric ceramic composition mentioned above.

Such a dielectric element contains the dielectric ceramic composition mentioned above, so it is useful to a capacitor to which a large permittivity is necessary when a high electric field is applied such as a capacitor used in an electric circuit to protect the electric circuit when a high electric field is applied.

According to the present invention, a dielectric ceramic composition will be provided that can be suitably utilized in a mid-high voltage application with a relatively high rated voltage and has a very small variation rate of DC bias of −15% or less under an electric field of 5 V/μm and also a relatively high relative permittivity of 1000 or more. Also, a dielectric element using this dielectric ceramic composition will be provided.

DETAILED DESCRIPTION OF EMBODIMENTS

Hereinafter, the preferable embodiments of the present invention will be described depending on cases with reference to the drawings. In each figure, the same symbol is marked for the same or equivalent element and repeated descriptions will be omitted.

Figure 1:
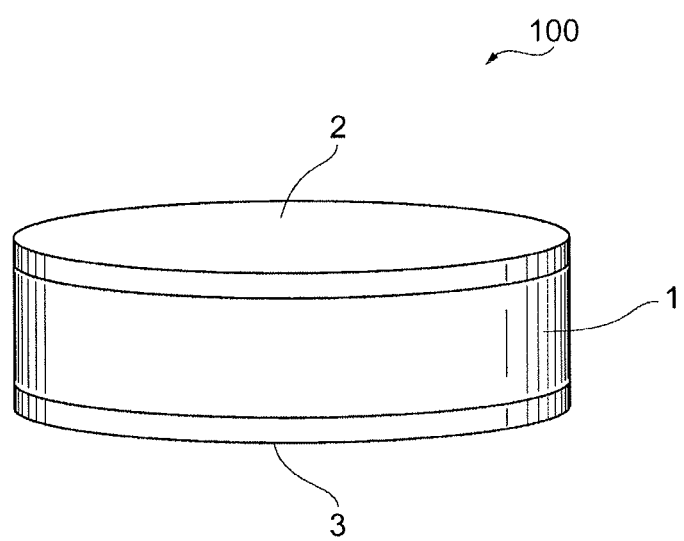
FIG. 1 is a schematic view showing one preferable embodiment of the dielectric element of the present invention.

FIG. 1 is a schematic view showing one preferable embodiment of the dielectric element of the present invention. The dielectric element 100 as shown in FIG. 1 forms a capacitor having a disc-like dielectric body 1 and a pair of electrodes 2 and 3 disposed on both surfaces of the dielectric body 1.

The dielectric body 1 is formed by a dielectric ceramic composition represented by the following formula (1).

(1)

In formula (1), A represents at least one element selected from the group consisting of Li, Na and K, and a, b, c, d, s, t, u, v and x are numbers respectively satisfy the following formulae.

$0.10 \leq a < 0.95$ $0.00 < b \leq 0.85$ $0.05 \leq c \leq 0.70$ $a+b+c=1$ $0.10 \leq d \leq 0.50$ $0.90 \leq s+u \leq 1.00$ $0.45 \leq t \leq 0.50$ $0.45 \leq v \leq 0.50$ $0.95 \leq x \leq 1.05$ With the constitution mentioned above, such a dielectric ceramic composition is capable of providing a relative permittivity of 1000 or more and also decreasing the variation rate of DC bias to a very low level of −15% or less under an electric field of 5 V/μm.

The dielectric ceramic of the present invention is a combination of ferroelectric composition and antiferroelectric composition. With such a specific combination, a dielectric ceramic composition with a relatively high relative permittivity and good DC bias related properties can be provided.

The a, b and c are not preferred to go beyond the ranges mentioned above. If they go beyond the ranges, the relative permittivity will become 1000 or less, the variation rate of DC bias under an electric field of 5 V/μm will become −15% or more and the withstand voltage will decrease.

The d is neither preferred to be less than 0.10 nor more than 0.50. If d is less than 0.10, the DC bias related properties may deteriorate. If d is more than 0.50, the permittivity will be less than 1000.

The s+u, t and v are not preferred to go beyond the ranges mentioned above. Otherwise, defects will be generated and no sufficient sintering density will be provided. In addition, charges will be leaked and the withstand voltage decreases.

No sufficient sintering density will be provided and the insulation resistance will decrease if x is less than 0.95 or more than 1.05. As a result, the dielectric ceramic composition is difficult to be used when a high electrical field is applied.

From the viewpoint of a sufficient permittivity for the application as a dielectric ceramic composition, the amount of the complex oxides represented by formula (1) preferably accounts for 90 mass % or more based on the whole dielectric ceramic composition. For the remaining part, in addition to the subcomponents such as paraelectric ceramic composition, impurities such as P and Zr which may be mixed during the preparation processes can also be contained.

Here, the composition of the dielectric ceramic composition can be measured by, for example, the X-ray fluorescence analysis or the ICP emission spectrometric analysis.

The dielectric ceramic composition preferably has a relative density of 95% or more. Here, in the specification of the present invention, the relative density refers to the actually measured value of density relative to the theoretical density. The theoretical density is calculated based on the lattice constant obtained via X-ray diffraction and the stoichiometric ratio obtained when the composition is assumed to be a perfect crystal. The relative density of the dielectric ceramic composition can be measured by, for example, the Archimedes method. Here, the relative density of the dielectric ceramic composition can be adjusted by changing the temperature or the time in the firing process.

Next, one example of the method for preparing the dielectric element shown in FIG. 1 will be described.

First of all, the powders of bismuth oxide ($Bi_2O_3$), sodium carbonate ($Na_2CO_3$), potassium carbonate ($K_2CO_3$), barium carbonate ($BaCO_3$), titanium oxide ($TiO_2$), niobium oxide ($Nb_2O_5$) and the like are prepared as the staring materials for the dielectric body 1.

These mentioned starting powders are weighed to make the dielectric ceramic composition (sintered body) after the official firing process will satisfy the composition of the dielectric ceramic composition of the present embodiment.

Then, all the weighed starting powder is wet mixed by a ball mill or the like. Thereby, the mixture obtained from the wetting mixing is subjected to a calcinating process to provide a calcined mixture. Here, the calcinating process is usually performed in air. In addition, the temperature during the calcinating process is preferred to be 700 to 900° C., and the time is preferred to be 1 to 10 hours.

After the calcined mixture is wet pulverized by a ball mill or the like, the pulverized powder is dried to provide a powder of the calcined mixture. Thereafter, a binder in a small amount is added to the obtained powder of calcined mixture, and a press molding process is performed to provide a molded body. Here, the pressure during the molding process is preferably about 5 t/cm². The shape of the molded body is not particularly restricted. For example, the molded body can be made into a disc-like one with a planar size of ɸ17 mm and a thickness of about 1 mm.

Then, the obtained molded body is fired to prepare a sample of the dielectric ceramic composition. Here, the firing process is usually performed in air. In addition, the temperature during the firing process is preferred to be 950 to 1300° C., and the time is preferred to be 2 to 10 hours.

Metallic electrodes of silver or the like are formed on both surfaces of the resultant sample of the dielectric ceramic composition. The formation of the electrodes is performed by a method such as vapor deposition, sputtering, enameling, electroless plating or the like.

Figure 2:
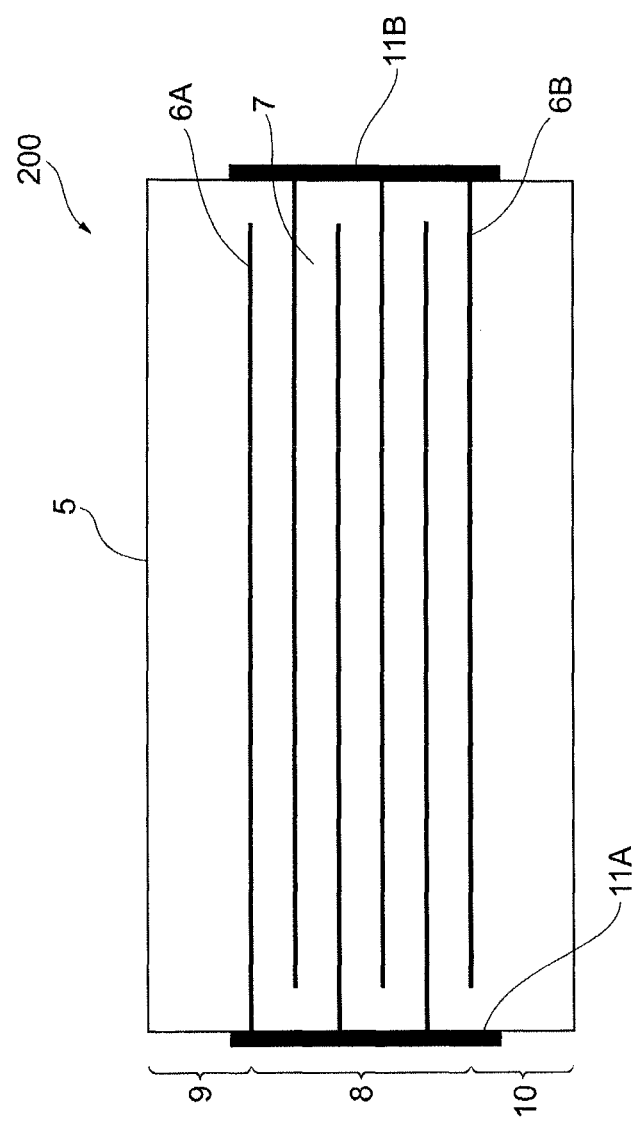
FIG. 2 is a cross-sectional view showing another embodiment of the dielectric element of the present invention.

FIG. 2 is a cross-sectional view showing another embodiment of the dielectric element of the present invention. The laminated dielectric element 200 shown in FIG. 2 has a rectangular laminated body 5 and a pair of terminal electrodes 11A and 11B respectively formed on the opposite end planes of the laminated body 5.

The laminated body 5 consists of a green body 8 and a pair of protection layers 9 and 10, wherein the green body 8 is formed by alternatively laminating internal electrode layers (electrode layers) 6A and 6B with a dielectric layer 7 interposed between 6A and 6B, and the pair of protection layers 9 and 10 are disposed to sandwich the green body 8 from the two end plane sides in the laminating direction (from top to bottom in the figure). In the green body 8, the dielectric layer 7 and the internal electrodes 6A and 6B are alternatively laminated.

The dielectric layer 7 is a layer composed of the dielectric ceramic composition of the present invention.

The thickness of each layer of the dielectric layer 7 can be randomly set. For example, the thickness can be 1 to 100 μm.

The internal electrode layers 6A and 6B are disposed to be parallel to each other. The internal electrode layer 6A is formed in such a manner that one end is exposed to the end plane in the laminated body 5 where the terminal electrode 11A is formed. In addition, the internal electrode layer 6B is formed in such a manner that one end is exposed to the end plane in the laminated body 5 where the terminal electrode 11B is formed. Further, the internal electrode layer 6A and the internal electrode layer 6B are disposed in such a manner that most of the two electrode layers overlap in the laminating direction.

As the material for the internal electrode layers 6A and 6B, for example, metals such as Au, Pt or Ag can be used.

On the end planes of the laminated body 5 where the terminal electrodes 11A and 11B are disposed, these terminal electrodes are respectively in contact with the end portion of the internal electrode layer 6A or 6B exposed to the mentioned end planes. In this respect, the terminal electrodes 11A and 11B are respectively electrically connected to the internal electrode layers 6A and 6B. The terminal electrodes 11A and 11B can be formed by conductive material having Ag, Au, Cu and the like as the main component(s). The thickness of the terminal electrodes 11A and 11B can be properly set depending on the uses or the size of the laminated dielectric element. For example, the thickness can be 10 to 50 μm.

The dielectric ceramic composition and the dielectric element of the present embodiments have been described above. These dielectric ceramic compositions have good DC bias related properties when a high electric field is applied and thus can be suitably utilized in a mid-high voltage capacitor with a relatively high rated voltage.

The present invention is not limited to the embodiments mentioned above. For example, as the constituents other than the dielectric ceramic composition, well known ones can be used. Further, for example, in the preparation of the dielectric element mentioned above, the powder of calcined mixture can be prepared through hydrothermal synthesis method. In addition, $(BiNa)TiO_3$, $(BiK)TiO_3$, $BaTiO_3$ and $NaNbO_3$ can be prepared, mixed and sintered to function as the precursor.

EXAMPLES

Hereinafter, the present invention will be further described in detail based on Examples and Comparative Examples. However, the present invention is not limited to the following Examples.

Examples 1 to 26 and Comparative Examples 1 to 16

In order to prepare a dielectric ceramic composition, the powders of bismuth oxide ($Bi_2O_3$), sodium carbonate ($Na_2CO_3$), potassium carbonate ($K_2CO_3$), barium carbonate ($BaCO_3$), titanium oxide ($TiO_2$) and niobium oxide ($Nb_2O_5$) were prepared as the staring materials. In Example 15, in addition to the starting materials mentioned above, powder of lithium carbonate ($Li_2CO_3$) was further prepared. For Examples 16 and 17, the powder of potassium carbonate ($K_2CO_3$) was additionally prepared besides the starting materials mentioned above.

These mentioned starting powder materials were weighed to make the dielectric ceramic composition (sintered body) after the official firing process satisfy the composition shown in Table 1. In addition, here, a, b, c, d, s+u, t, v and x in Table 1 respectively represents the numerical value of a, b, c, d, s+u, t, v and x in the following formula (1). In the Comparative Examples and Examples other than Examples 15 to 17, component A was Na. In Example 15, component A was Li. Further, component A was K in Example 16 and was Na and K in Example 17.

$$\{[(Bi_sNa_t)_a(Bi_uK_v)_bBa_c]_{1-d}A_d\}_xTi_{1-d}Nb_dO_3 \qquad (1)$$

Then, each weighed starting powder material was wet mixed by a ball mill, and the resultant mixture was subjected to a calcinating process in air at a temperature of 850° C. for 2 hours to provide a calcined mixture. The obtained calcined mixture was wet pulverized by a ball mill to provide the powder of the calcined mixture. Thereafter, the powder of calcined mixture was added with a binder in a small amount and was molded under a pressure of about 5 t/cm² to provide a disc-like molded body having a planar size of ϕ17 mm and a thickness of 1 mm.

Then, the obtained molded body was fired in air for 2 to 10 hours at a firing temperature of 950 to 1300° C. to provide a relative density of 95%. In this way, a sample of the dielectric ceramic composition was obtained. A density measurement was provided to the obtained dielectric ceramic sample, and the density was 95% or more relative to the theoretical density in all samples.

The composition was analyzed in the obtained dielectric ceramic composition sample. The results were equivalent to the composition ratios in the weighed components.

The Ag electrodes were provided to both surfaces of the obtained dielectric ceramic composition sample through vapor deposition to prepare a dielectric element.

The DC bias related properties were tested with the maximal intensity of the applied electric filed $E_{max}$ being 5V/μm for each obtained dielectric element.

A withstanding voltage test was performed on each dielectric element under a direct current electric field of 10 V/μm.

The relative permittivity at room temperature of 25° C. and the DC bias related properties were shown in Table 1. In addition, the short straight line in the Table meant no specific value had been obtained due to the charge leakage during the measurement. Further, as for items of the withstanding voltage test in the table, the sample without breakdown was labeled with 'o' and the one with breakdown was labeled with 'x'. The sample was deemed as a good one when the relative permittivity was 1000 or higher, the variation rate of DC bias was −15% or less under an electric field of 5V/μm and without breakdown under a direct current electric field of 10 V/μm.

TABLE 1

| | a | b | c | d | x | s + u | t | v | A | Permittivity (0 V/μm) | Permittivity (5 V/μm) | Variation rate of DC bias (5 V/μm) | Withstanding voltage test (10 V/μm) |
|---|---|---|---|---|---|---|---|---|---|---|---|---|---|
| Comparative Example 1 | 0.85 | 0.09 | 0.05 | 0.09 | 0.99 | 1.00 | 0.50 | 0.50 | Na | 1707 | 1426 | −16.5 | o |
| Comparative Example 2 | 0.00 | 0.50 | 0.50 | 0.10 | 0.99 | 1.00 | 0.50 | 0.50 | Na | 1708 | 1284 | −24.8 | o |
| Comparative Example 3 | 0.05 | 0.90 | 0.05 | 0.10 | 0.99 | 1.00 | 0.50 | 0.50 | Na | 903 | 832 | −7.9 | o |
| Comparative Example 4 | 0.10 | 0.10 | 0.80 | 0.10 | 0.99 | 1.00 | 0.50 | 0.50 | Na | 2323 | 1929 | −16.9 | o |
| Example 1 | 0.10 | 0.80 | 0.10 | 0.10 | 0.99 | 1.00 | 0.50 | 0.50 | Na | 1191 | 1179 | −1.0 | o |
| Example 2 | 0.10 | 0.85 | 0.05 | 0.10 | 0.99 | 1.00 | 0.50 | 0.50 | Na | 1222 | 1198 | −2.0 | o |
| Example 3 | 0.25 | 0.05 | 0.70 | 0.10 | 0.99 | 1.00 | 0.50 | 0.50 | Na | 1204 | 1132 | −6.0 | o |
| Example 4 | 0.33 | 0.33 | 0.33 | 0.10 | 0.99 | 1.00 | 0.50 | 0.50 | Na | 1962 | 1911 | −2.6 | o |
| Comparative Example 5 | 0.50 | 0.00 | 0.50 | 0.10 | 0.99 | 1.00 | 0.50 | 0.50 | Na | 2473 | 2318 | −6.2 | x |
| Example 5 | 0.60 | 0.20 | 0.20 | 0.10 | 0.99 | 1.00 | 0.50 | 0.50 | Na | 2078 | 1872 | −9.9 | o |
| Example 6 | 0.80 | 0.10 | 0.10 | 0.10 | 0.99 | 1.00 | 0.50 | 0.50 | Na | 2071 | 1860 | −10.2 | o |
| Example 7 | 0.85 | 0.09 | 0.05 | 0.10 | 0.99 | 1.00 | 0.50 | 0.50 | Na | 2056 | 1759 | −14.4 | o |
| Example 8 | 0.90 | 0.01 | 0.09 | 0.10 | 0.99 | 1.00 | 0.50 | 0.50 | Na | 2008 | 1882 | −6.3 | o |
| Comparative Example 6 | 0.95 | 0.00 | 0.05 | 0.10 | 0.99 | 1.00 | 0.50 | 0.50 | Na | 1910 | 1839 | −3.7 | x |
| Example 9 | 0.33 | 0.33 | 0.33 | 0.20 | 0.99 | 1.00 | 0.50 | 0.50 | Na | 2278 | 2188 | −4.0 | o |
| Comparative Example 7 | 0.33 | 0.33 | 0.33 | 0.30 | 0.93 | 1.00 | 0.50 | 0.50 | Na | — | — | — | x |
| Example 10 | 0.33 | 0.33 | 0.33 | 0.30 | 0.95 | 1.00 | 0.50 | 0.50 | Na | 2077 | 1957 | −5.8 | o |
| Comparative Example 8 | 0.33 | 0.33 | 0.33 | 0.30 | 0.99 | 0.80 | 0.45 | 0.45 | Na | 2019 | 1898 | −6.0 | x |
| Example 11 | 0.33 | 0.33 | 0.33 | 0.30 | 0.99 | 0.90 | 0.45 | 0.45 | Na | 2001 | 1913 | −4.4 | o |
| Comparative Example 9 | 0.33 | 0.33 | 0.33 | 0.30 | 0.99 | 0.95 | 0.40 | 0.50 | Na | — | — | — | x |
| Example 12 | 0.33 | 0.33 | 0.33 | 0.30 | 0.99 | 0.95 | 0.45 | 0.50 | Na | 1990 | 1910 | −4.0 | o |
| Comparative Example 10 | 0.33 | 0.33 | 0.33 | 0.30 | 0.99 | 0.95 | 0.50 | 0.40 | Na | — | — | — | x |
| Example 13 | 0.33 | 0.33 | 0.33 | 0.30 | 0.99 | 0.95 | 0.50 | 0.45 | Na | 1972 | 1927 | −2.3 | o |
| Example 14 | 0.33 | 0.33 | 0.33 | 0.30 | 0.99 | 1.00 | 0.50 | 0.50 | Na | 2056 | 1922 | −6.5 | o |
| Example 15 | 0.33 | 0.33 | 0.33 | 0.30 | 0.99 | 1.00 | 0.50 | 0.50 | Li | 2052 | 1917 | −6.6 | o |
| Example 16 | 0.33 | 0.33 | 0.33 | 0.30 | 0.99 | 1.00 | 0.50 | 0.50 | K | 2063 | 1926 | −6.6 | o |
| Example 17 | 0.33 | 0.33 | 0.33 | 0.30 | 0.99 | 1.00 | 0.50 | 0.50 | Na, K | 2019 | 1897 | −6.0 | o |
| Comparative Example 11 | 0.33 | 0.33 | 0.33 | 0.30 | 0.99 | 1.00 | 0.50 | 0.55 | Na | 2101 | — | — | x |
| Comparative Example 12 | 0.33 | 0.33 | 0.33 | 0.30 | 0.99 | 1.00 | 0.55 | 0.50 | Na | 2043 | — | — | x |
| Comparative Example 13 | 0.33 | 0.33 | 0.33 | 0.30 | 0.99 | 1.10 | 0.50 | 0.50 | Na | 2012 | 1895 | −5.8 | x |
| Example 18 | 0.33 | 0.33 | 0.33 | 0.30 | 1.05 | 1.00 | 0.50 | 0.50 | Na | 2028 | 1875 | −7.5 | o |
| Comparative Example 14 | 0.33 | 0.33 | 0.33 | 0.30 | 1.06 | 1.00 | 0.50 | 0.50 | Na | 2043 | 1908 | −6.6 | x |
| Example 19 | 0.60 | 0.20 | 0.20 | 0.30 | 0.99 | 1.00 | 0.50 | 0.50 | Na | 2449 | 2218 | −9.4 | o |
| Example 20 | 0.80 | 0.10 | 0.10 | 0.30 | 0.99 | 1.00 | 0.50 | 0.50 | Na | 1958 | 1838 | −6.1 | o |
| Example 21 | 0.85 | 0.09 | 0.05 | 0.30 | 0.99 | 1.00 | 0.50 | 0.50 | Na | 1730 | 1633 | −5.6 | o |
| Example 22 | 0.33 | 0.33 | 0.33 | 0.40 | 0.99 | 1.00 | 0.50 | 0.50 | Na | 1914 | 1732 | −9.5 | o |
| Comparative Example 15 | 0.10 | 0.15 | 0.75 | 0.50 | 0.99 | 1.00 | 0.50 | 0.50 | Na | 2406 | 1963 | −18.4 | o |

TABLE 1-continued

|  | a | b | c | d | x | s + u | t | v | A | Permittivity (0 V/μm) | Permittivity (5 V/μm) | Variation rate of DC bias (5 V/μm) | Withstanding voltage test (10 V/μm) |
|---|---|---|---|---|---|---|---|---|---|---|---|---|---|
| Example 23 | 0.10 | 0.85 | 0.05 | 0.50 | 0.99 | 1.00 | 0.50 | 0.50 | Na | 1080 | 1074 | −0.6 | ○ |
| Example 24 | 0.25 | 0.05 | 0.70 | 0.50 | 0.99 | 1.00 | 0.50 | 0.50 | Na | 1062 | 1006 | −5.3 | ○ |
| Example 25 | 0.85 | 0.09 | 0.05 | 0.50 | 0.99 | 1.00 | 0.50 | 0.50 | Na | 1402 | 1366 | −2.6 | ○ |
| Example 26 | 0.90 | 0.01 | 0.09 | 0.50 | 0.99 | 1.00 | 0.50 | 0.50 | Na | 1501 | 1477 | −1.6 | ○ |
| Comparative Example 16 | 0.33 | 0.33 | 0.33 | 0.60 | 0.99 | 1.00 | 0.50 | 0.50 | Na | 997 | 982 | −1.5 | x |

It can be confirmed from Table 1 that the dielectric ceramic compositions of Examples 1 to 26 had a small variation rate of DC bias and a sufficiently large permittivity for application when a high electric field was applied.

DESCRIPTION OF REFERENCE NUMERALS

1 dielectric body
2,3 electrode
5 laminated body
6A,6B internal electrode layer
7 dielectric layer
8 green body
9,10 protection layer
11A,11B terminal electrode
100 dielectric element
200 laminated dielectric element

What is claimed is:

1. A dielectric ceramic composition comprising a composition represented by the following formula (1), $$\{[(Bi_sNa_t)_a(Bi_uK_v)_bBa_c]_{1-d}A_d\}_xTi_{1-d}Nb_dO_3 \quad (1)$$

wherein, in formula (1), A represents at least one element selected from the group consisting of Li, Na and K, and a, b, c, d, s, t, u, v and x are numbers respectively satisfying the following formulae, $$0.10 \leq a < 0.95,$$

$$0.00 < b \leq 0.85,$$

$$0.05 \leq c \leq 0.70,$$

$$a+b+c=1,$$

$$0.10 \leq d \leq 0.50,$$

$$0.90 \leq s+u \leq 1.00,$$

$$0.45 \leq t \leq 0.50,$$

$$0.45 \leq v \leq 0.50,$$

$$0.95 \leq x \leq 1.05.$$

2. A dielectric element comprising the dielectric ceramic composition of claim 1.

* * * * *